May 6, 1930. P. E. FENTON 1,757,421
RESILIENT SNAP FASTENER MEMBER
Filed Nov. 30, 1928
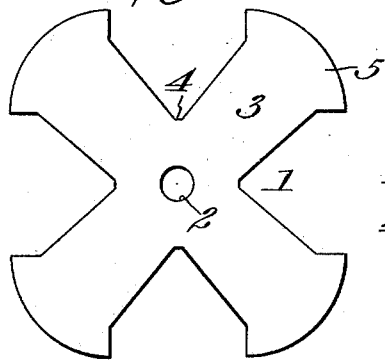
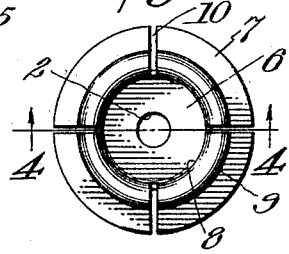
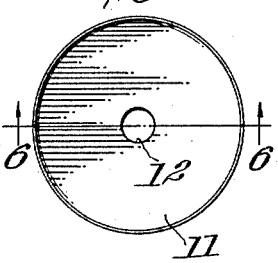
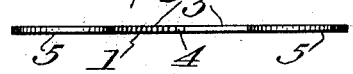
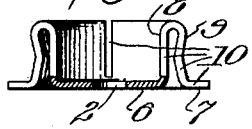
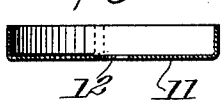
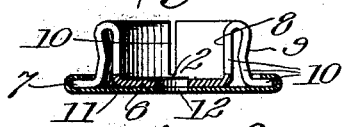
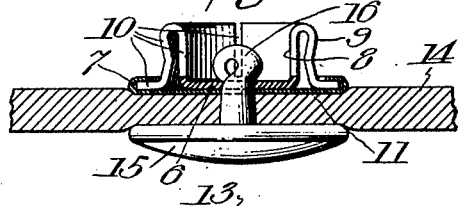
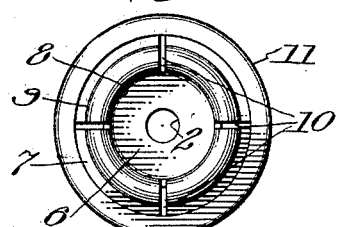
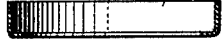
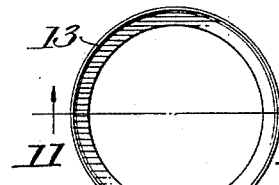
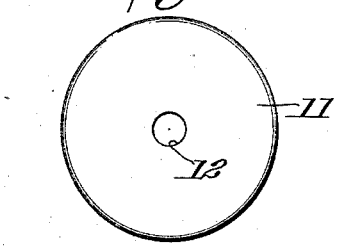
Inventor
Paul E. Fenton
by
Attorney.

Patented May 6, 1930

1,757,421

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

RESILIENT SNAP-FASTENER MEMBER

Application filed November 30, 1928. Serial No. 322,916.

The object of this invention is to provide a resilient snap fastener member, particularly the stud member, and the invention is in the nature of a variation of the constructions forming the subject of my copending application filed September 11, 1928, Serial No. 305,191.

The invention consists of a member having an inner solid rim and an outer resilient rim, from which rise substantially parallel resilient walls, which, in connection with the outer rim form the active resilient element of the device, which is adapted to cooperate with a complemental member for securing parts together, the rims being reinforced by a transversely applied outside shell in contact with both rims and closed down over the outer rim, as I will proceed now to explain and finally claim.

In the accompanying drawings illustrating the invention, in the several figures of which like parts are similarly designated, Figure 1 is a plan view of a blank from which the device may be made, and Fig. 2 is an edge view of such blank. Fig. 3 is a top plan view, and Fig. 4 is a cross section on line 4—4 of Fig. 3, of the blank folded to form the inner rim and outer rim and the intervening elevated walls. Fig. 5 is a top plan view, and Fig. 6 is a cross section on line 6—6 of Fig. 5, of the shell which is to be applied to the rims. Fig. 7 is a cross section of the finished article; Fig. 8 is a top plan view thereof, and Fig. 9 is a bottom plan view thereof. Fig. 10 is a sectional elevation showing the device applied to an object by means of a tack. Fig. 11 is a cross section, on line 11—11 of Fig. 12, and Fig. 12 is a top plan view of a ring-like shell. Fig. 13 is a cross section illustrating the device supplied with the ring-like shell.

In the device of the application above referred to, the slots or slits are made by a slotting operation, whereas the device of the present invention preferably is made from a star-like blank 1, substantially as shown in Fig. 1, which has a central opening 2, and a series of radiating arms 3 spaced apart by the portions 4, and terminating in laterally extending portions 5. This blank is folded so as to leave the portion containing the opening 2 as a flat surface and a flat surface on the outside formed by the parts 5, the raised walls standing up from the flat portions and connecting them. The flat portion surrounding the opening 2 is herein referred to as the inner rim 6; the outer flat portions are herein referred to as the outer rim 7, and the substantially parallel upstanding walls are designated 8 and 9. The spaces between the parts 3 form the slots 10 which extend through both walls and the outer rim.

The portions 4 serve to space apart the arms 3 sufficiently to leave the slots 10 in the walls and in the outer rim, so as to impart resilience to the device when cooperating with a complemental snap-fastener element.

The rigidity of the outer rim is preserved by the application of the flanged shell 11, which has the central opening 12 to register with the opening 2 in the solid inner rim 6, and the closing, more or less tightly, of its flange above the outer rim 7. The holed portion of the shell is in contact with the under side of the rims 6 and 7 and supports said rims, and the closing down of the flange of the shell over the upper side of the outer rim serves to prevent the undue spreading of said rim, and also the maintenance of the resilience of the device.

As shown in Figs. 11, 12 and 13 there may be used a ring-like flanged shell 13, which engages the outer rim only.

In either form of shell, the engagement thereof with the outer rim may be rigid, or such engagement may be sufficiently loose to permit a slight expansion and contraction, but in either case the engagement is such as to prevent deformation or distortion of the walled member, without interference with the resiliency of the device.

In the invention of the application referred to, the openings in the walls do not extend into the outer rim, and are made by slotting, while in the present invention the openings are formed by the cutting and folding of the blank.

The snap-fastener member may be attached to an object, represented at 14, in Fig. 10, by means of a tack 15 the point or shank 16 of which is driven through the object 14 and the openings in the shell and inner rim and clenched therein; but any other suitable fastener, such as a hollow eyelet or post, or a screw, as disclosed in the previously mentioned case, may be used.

The invention is applicable not only to a stud member, but also to a socket member of a resilient snap fastener.

Variations in the details of construction are deemed to be within the principle of the invention and the claims following.

What I claim is:—

1. A snap fastener member, having an outer rim composed of a series of spaced-apart members and an inner solid and non-resilient rim, and intervening upstanding walls composed of a series of arms spaced apart from one another and rising from and connecting the outer and inner rims, the spacings in the walls and the outer rim serving to impart resilience to the walls and the outer rim.

2. A snap fastener member, having an outer rim composed of a series of spaced-apart members and an inner solid and non-resilient rim, and intervening upstanding walls composed of a plurality of arms spaced apart from one another and rising from and connecting the outer and inner rims, the spacings in the walls and the outer rim serving to impart resilience to the walls and the outer rim, and a shell applied to the outer rim.

3. A snap fastener member, having an outer resilient rim composed of a plurality of spaced-apart members and an inner solid and non-resilient rim, and intervening upstanding walls rising from and connecting the outer and inner rims and continuous of the members of the resilient outer rim, and a shell applied to the outer rim, said shell extending beneath the outer and inner rims and supporting them without impairing the resilience of the outer rim.

4. A resilient snap fastener member, having an inner solid and non-resilient rim provided with a central opening, an outer resilient rim, upstanding resilient walls rising from and connecting the inner and outer rims, the walls and the outer rim being composed of laterally spaced apart members, and a shell closed down over the outer rim and underlying and supporting both rims without impairing the resilience of the outer rim and having an opening registering with the opening in the inner rim.

In testimony whereof I have hereunto set my hand this 28th day of November, A. D. 1928.

PAUL E. FENTON.